UNITED STATES PATENT OFFICE.

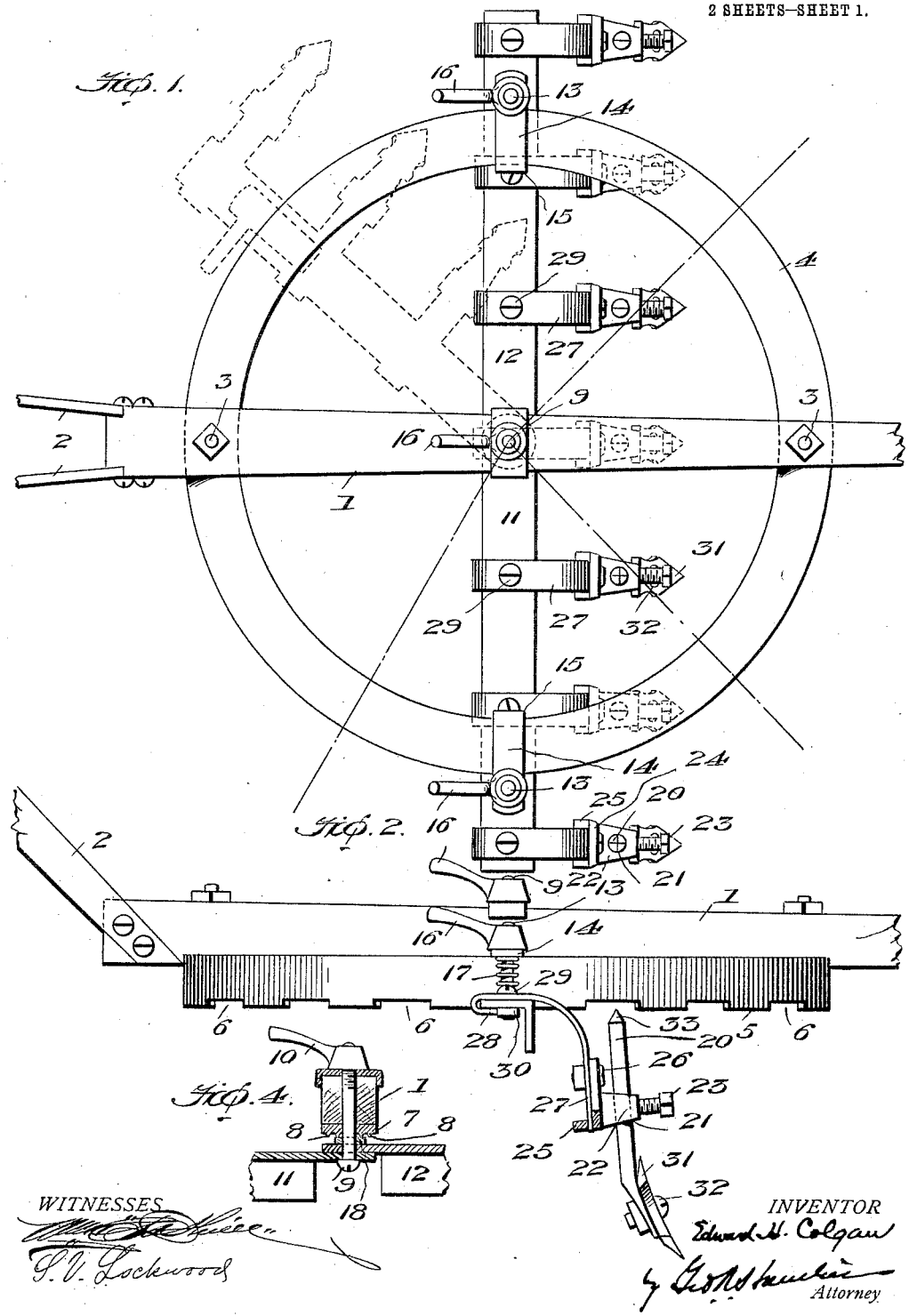

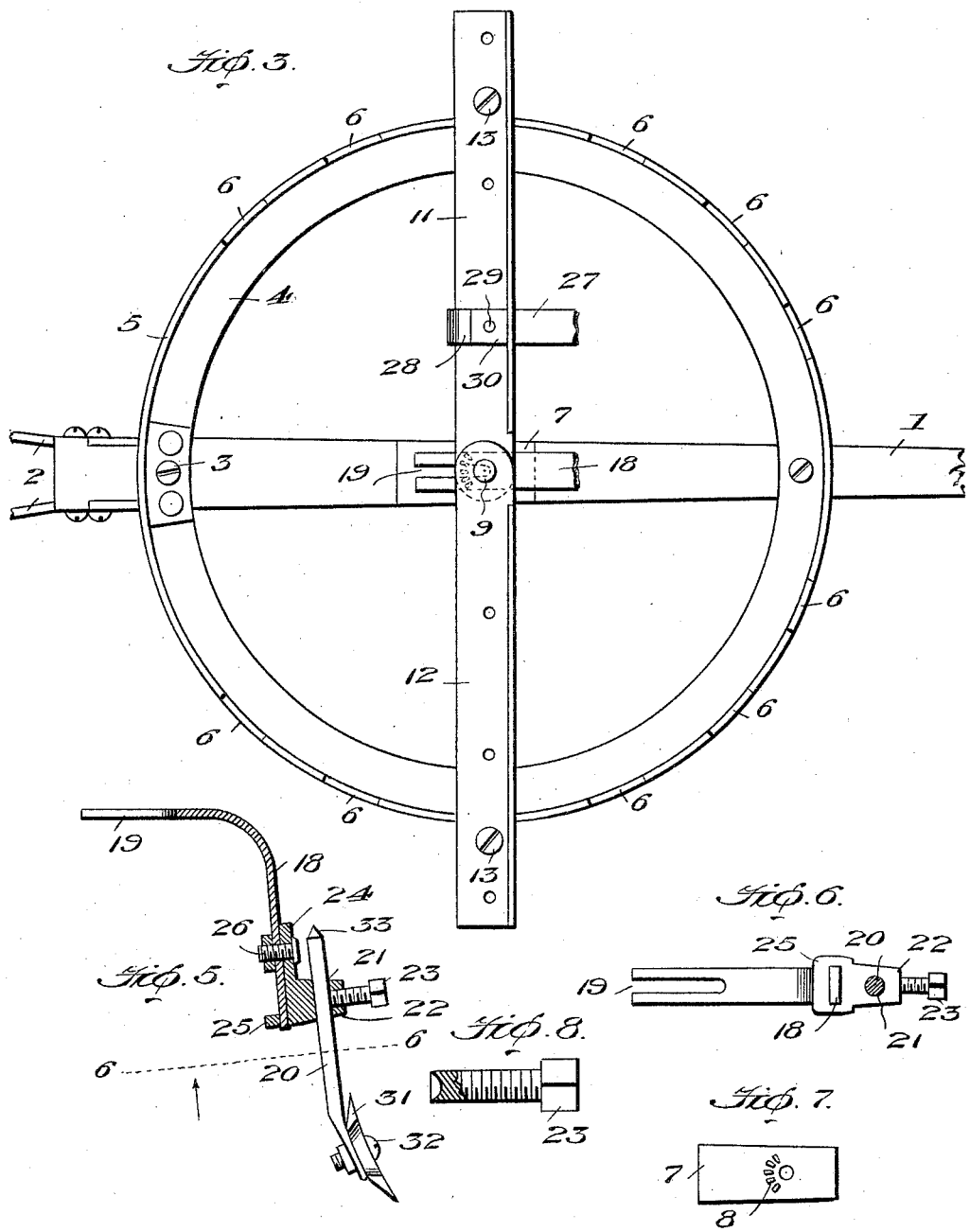

EDWARD H. COLGAN, OF LITTLE ROCK, ARKANSAS.

CULTIVATOR.

1,044,497. Specification of Letters Patent. Patented Nov. 19, 1912.

Application filed March 21, 1912. Serial No. 685,253.

*To all whom it may concern:*

Be it known that I, EDWARD H. COLGAN, a citizen of the United States, residing at Little Rock, county of Pulaski, and State of Arkansas, have invented certain new and useful Improvements in Cultivators, of which the following is a specification.

This invention relates to cultivators.

The object of the present invention is the provision of an adjustable cultivator of improved construction in which the shovel carrying beams are pivoted and may be adjusted angularly in any desired manner in relation to each other and used separately; wherein the shovels may be raised or lowered, turned to different angles, reversed; wherein the cultivator standards are arranged and constructed for reversal so that they may be used either for cultivating or for harrowing purposes; and in which there will be provided a special center shovel adjustable in a circle to dispose it at any desired position or angle in relation to the other shovels and which may also be used as a harrow.

In carrying out the invention, there is provided, first, an improved standard and fastening for securing a shovel to a cultivator beam; second, a new adjustable shovel shank; third, a novel reversible combined shovel and harrow; fourth, a novel rotatably mounted shovel or harrow standard which can be swung around laterally to any desired position, together with the means for securing it; fifth, cultivator beams removably, pivotally connected together and capable of independent or conjoint use; sixth, one or more swinging cultivator beams and improved means, including a frame, a spring, and a clamp, for securing it or them in different positions; further, in certain features of construction and novel arrangements and combinations of parts more fully set forth hereinafter.

The invention, in its different aspects, is recited in the appended claims.

In the accompanying drawings:—Figure 1 is a plan view, dotted lines representing one of the cultivator beams swung back; Fig. 2, a side elevation; Fig. 3, a bottom plan of the cultivator with most of the standards and shovels removed; Fig. 4, a detail section showing the means for securing and pivoting the cultivator beams and for clamping the center shovel and its standard; Fig. 5, a detail elevation partly in section, showing one of the standards, the reversible stem, and the fastening devices; Fig. 6, a section on line 6—6, Fig. 5; Fig. 7, a detail of the plate against which the center standard is clamped; and Fig. 8, a detail, partly broken away, of one of the clamping screws for a cultivator shovel stem.

The draft beam 1 may have any suitable handle 2 and any desired means by which it may be drawn by draft animals or otherwise.

Secured by bolts 3, or in any other preferred manner, to the draft beam 1 is a circular frame 4 of angle-iron which has a depending flange 5 provided with notches 6.

Sunk into the bottom side of the draft beam 1, if the latter is of wood, or constituting a part thereof if of metal, is a locking plate 7 provided with ridges 8, preferably arranged in general radial relation, and the center pivotal and clamping bolt 9, which latter has a handle screw clamp nut 10 and serves to pivotally connect together and to the draft beam, the cultivator beams 11 and 12 which are formed of angle iron and extend beyond the frame 4. They are adapted to fit in the notches 6 and thus the strain is distributed between the frame 4 and the draft beam 1. Extending through the horizontal portions of the cultivator beams are clamping screws 13 which also pass through clamps 14 that overlie the frame 4 and are provided with hooks 15 engaging it. Clamping nuts, preferably provided with handles, 16, serve to clamp the cultivator beams to the frame so that when these beams are in the notches they are secured against displacement. Coil springs 17 surround the bolts 13 and exert a pressure both on the clamps and the cultivator beams, in consequence of which when the clamping nuts are loosened preparatory to disengaging the beams from the frame 4, the springs, in each instance, tend to force the beams downwardly and disengage them from the notches in frame 4, thus facilitating the release of the cultivator beams from the frame.

The center standard 18 is of flat, springy metal and provided with a bifurcated part 19 which straddles the clamping bolt 9 and is disposed between the plate 7 and the cultivator beams. The ridges 8 coöperate with the bifurcated end 19 and, together with the clamping action of the bolt 9, hold the spring standard 18 firmly clamped in the position to which it is adjusted. This center standard 18 is thus made adjustable in a complete circle to any desired position so that it may be disposed either forwardly or rearwardly of the other cultivator standard and, with the axial adjustment of the cultivator shanks, as will presently appear, any desired relative positioning of the shovels may be effected.

The cultivator shovel stem 20, which is cylindrical, passes through a round hole 21 in a head 22 and is held by a clamping screw 23 in any position to which it may be adjusted vertically or to which it may be turned. The head has a plate 24 adapted to bear against the standard 18, a flange 25 having a slot receiving the end part of the standard 18. A bolt and nut 26 passes through the base of the head and through the standard. Thus, by a single bolt fastening, I am able to securely connect the head and ends of the cultivator shank to the standard, with capacity for quick, easy removal, any desired adjustment of the cultivator stem.

The attachment of all of the cultivator shovels and stems to their spring standards 27 is effected by the same construction as that just described. The spring standards 27 of the remaining cultivator shovels overlie the horizontal parts of the cultivator beams and are provided with hooked ends 28 which engage the heads thereof. Bolts 29 pass through the overlying parts of the spring standards 27 and through the horizontal parts of the cultivator beams and are provided with nuts 30 which are locked in position by having one edge engage the vertical web of the cultivator beams and the other edge the hooked end 28. Thus, with a single bolt, the cultivator standards are secured to their beams, adapted for easy detachment, and the strain is largely removed from them.

Reversible or double cultivator shovels 31 are connected to the lower ends of the stems by bolts and nuts 32. When one point becomes dull, the shovels may be reversed and the other point used.

The stems may be provided on their upper ends with points or teeth 33 so that, on reversal of the stems, the machine may be used as a harrow instead of as a cultivator.

The cultivator beams may be adjusted to any desired angles in relation to each other and locked to the frame 4. The center standard and its shovel may be adjusted laterally in a complete circle to any desired position, either in line with or backwardly or forwardly of the remaining shovels, and similarly, if the stems are reversed and the machine used as a harrow, the same effects may be obtained. One of the cultivator beams may be removed and the machine operated with the remaining beam only.

Having thus described my invention, what I claim as new and desire to secure by Letters Patent, is:—

1. In a cultivator or harrow, the combination with a frame having arc-shaped parts provided with notches, of pivoted beams carrying earth-treating devices adapted to engage the notches, clamping devices adapted to coöperate with the beams and the frame to hold the beams in the notches, and springs tending to disengage the beams from the notches.

2. In a cultivator or harrow, the combination with a frame having arc-shaped parts provided with notches, of pivoted beams carrying earth-treating devices adapted to engage the notches, clamp plates bearing on the frame and provided with hooked ends engaging said frame, clamping bolts connecting the clamp plates with the beams and adapted to hold the beams in the notches, and coil springs surrounding said clamp bolts and tending to disengage the beams from the notches.

3. In a cultivator or harrow, the combination with the frame thereof, of a pivoted swinging beam carrying earth-engaging devices, a pivotal clamping bolt for connecting said beam to said frame, and a bifurcated standard carrying an earth-engaging device and having its bifurcated part straddling the bolt and clamped by the bolt, said standard being adjustable independently of the beam and independently of the earth-engaging devices carried by said beam.

4. In a cultivator or harrow the combination with a frame, of a laterally swinging beam carried thereby, cultivating devices carried by the beam, a circularly adjustable standard carrying an earth-engaging device and provided with a pivoted part disposed substantially centrally of the frame, a plate having ribs or ridges adapted to engage said standard, and a clamping bolt passing through the bifurcation of the standard and through the plate.

5. In a cultivator or harrow, the combination with a beam which in cross-sectional shape has its parts disposed at an angle to each other, of a standard extending crosswise of the beam and provided with a hooked part engaging one edge thereof, a bolt passing through the standard and through the beam, and a nut on the bolt which is disposed between and engaged by the hooked end and the other part of the beam, whereby the nut is prevented from loosening.

In testimony whereof, I hereunto affix my signature in presence of two witnesses.

EDWARD H. COLGAN.

Witnesses:
 R. E. WILEY,
 JNO. F. CLIFFORD.

Copies of this patent may be obtained for five cents each, by addressing the "Commissioner of Patents, Washington, D. C."